US010145961B1

(12) United States Patent
Stockmaster et al.

(10) Patent No.: US 10,145,961 B1
(45) Date of Patent: Dec. 4, 2018

(54) EFFICIENT TRANSFORM-BASED QUANTIZATION PROCESSING

(71) Applicant: Rockwell Collins, Inc., Cedar Rapids, IA (US)

(72) Inventors: Michael H. Stockmaster, Cedar Rapids, IA (US); Thomas V. Dewulf, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 15/140,268

(22) Filed: Apr. 27, 2016

(51) Int. Cl.

| | |
|---|---|
| ***G01S 19/37*** | (2010.01) |
| *G01S 19/21* | (2010.01) |
| *G01S 19/24* | (2010.01) |
| *G01S 5/02* | (2010.01) |

(52) U.S. Cl.
CPC ............. *G01S 19/37* (2013.01); *G01S 5/0215* (2013.01); *G01S 19/21* (2013.01); *G01S 19/24* (2013.01)

(58) Field of Classification Search
CPC .......... G01S 19/37; G01S 19/24; G01S 19/21; G01S 5/0215
USPC .......................... 342/357.77, 357.59, 357.63
See application file for complete search history.

(56) References Cited

U.S. PATENT DOCUMENTS

| | | | | |
|---|---|---|---|---|
| 5,809,270 A * | 9/1998 | Robbins | G06F 9/3867 | 712/200 |
| 6,292,592 B1 * | 9/2001 | Braunreiter | G01S 3/7864 | 342/90 |
| 6,611,627 B1 * | 8/2003 | LaRossa | G06T 5/10 | 382/240 |
| 7,324,036 B2 * | 1/2008 | Petre | H03M 1/121 | 341/110 |
| 7,596,179 B2 * | 9/2009 | Shen | G06T 3/4084 | 375/240.16 |
| 7,778,367 B1 * | 8/2010 | Stockmaster | G01S 5/0215 | 375/240.19 |
| 7,920,624 B2 * | 4/2011 | Hsiun | H04N 19/93 | 375/240.02 |
| 9,658,314 B2 * | 5/2017 | Parks | G01S 5/04 | |
| 9,838,151 B1 * | 12/2017 | Stockmaster | H04K 3/22 | |
| 2006/0245500 A1 * | 11/2006 | Yonovitz | G01S 3/7865 | 375/240.19 |
| 2018/0192076 A1 * | 7/2018 | Ikai | H04N 19/157 | |

* cited by examiner

*Primary Examiner* — Chuong P Nguyen
(74) *Attorney, Agent, or Firm* — Angel N. Gerdzhikov; Donna P. Suchy; Daniel M. Barbieri

(57) ABSTRACT

Efficient transform-based quantization methods and quantization processors implementing such efficient transform-based quantization methods are disclosed. A transform-based quantization method may include: receiving an input signal transformed in a transform domain; producing a low-resolution signal by reducing a resolution of the input signal according to a reduction ratio; inversely transforming the low-resolution signal to produce an inversely transformed low-resolution signal; and quantizing the inversely transformed low-resolution signal to produce a quantized output.

15 Claims, 3 Drawing Sheets

EFFICIENT TRANSFORM-BASED QUANTIZATION PROCESSING

BACKGROUND

In signal processing, quantization is a process of mapping input values to a finite set of discrete values. Satellite navigation (e.g., Global Positioning System, or GPS) receivers typically use relatively crude quantization processes to minimize processing complexities. Commercial receivers, for example, may use 1-bit (or 2-level) quantizers that are configured to map input values to two discrete values. Quantizers with slightly higher resolutions (e.g., 1.5-bit, or 3-level quantizers capable of mapping input values to three discrete values) may be used in receivers that are configured to provide better conversion gain against certain waveform types.

Receivers that are designed to operate with anti-jam functionalities typically use much higher resolution processing to provide higher levels of interference mitigation. After the higher resolution processing, the high-resolution signal may be converted to a crude 2 or 3-level quantization to interface with satellite navigation receivers. For receivers that perform time domain anti-jam processing, this conversion process may be straightforward. However, if transform-based (e.g., fast Fourier transform, or FFT-based) interference mitigation techniques are used, an inverse transform function must be performed prior to the quantization process. Performing an inverse transform function on a high-resolution signal is complicated and time-consuming.

SUMMARY

In one aspect, embodiments of the inventive concepts disclosed herein are directed to an apparatus. The apparatus may include a resolution reducer configured to receive an input signal transformed in a transform domain. The resolution reducer may be further configured to produce a low-resolution signal by reducing a resolution of the input signal according to a reduction ratio. The apparatus may also include an inverse transform processor configured to inversely transform the low-resolution signal to produce an inversely transformed low-resolution signal. The apparatus may further include a quantizer configured to quantize the inversely transformed low-resolution signal to produce a quantized output.

In a further aspect, embodiments of the inventive concepts disclosed herein are directed to an apparatus. The apparatus may include at least one processor configured to: receive an input signal transformed in a transform domain; produce a low-resolution signal by reducing a resolution of the input signal according to a reduction ratio; inversely transform the low-resolution signal to produce an inversely transformed low-resolution signal; and quantize the inversely transformed low-resolution signal to produce a quantized output.

In another aspect, embodiments of the inventive concepts disclosed herein are directed to a method. The method may include: receiving an input signal transformed in a transform domain; producing a low-resolution signal by reducing a resolution of the input signal according to a reduction ratio; inversely transforming the low-resolution signal to produce an inversely transformed low-resolution signal; and quantizing the inversely transformed low-resolution signal to produce a quantized output.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
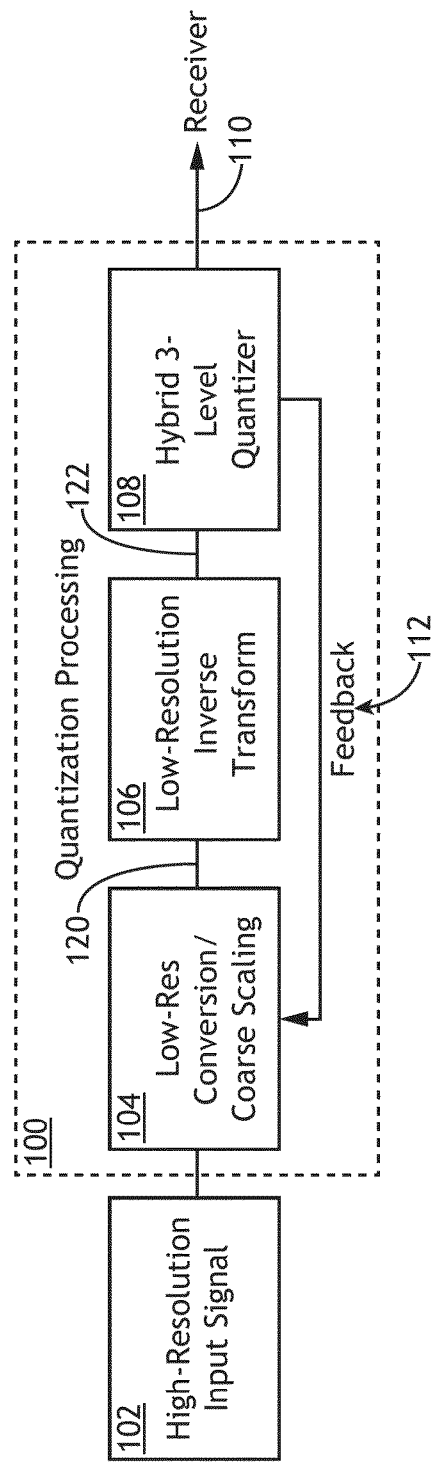
FIG. 1 is a block diagram of an exemplary quantization processor according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of embodiments of the instant inventive concepts. This is done merely for convenience and to give a general sense of the inventive concepts, and “a” and “an” are intended to include one or at least one and the singular also includes the plural unless it is obvious that it is meant otherwise.

Finally, as used herein any reference to “one embodiment,” or “some embodiments” means that a particular element, feature, structure, or characteristic described in connection with the embodiment is included in at least one embodiment of the inventive concepts disclosed herein. The appearances of the phrase “in some embodiments” in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to efficient transform-based quantization methods and quantization processors implementing such efficient transform-based quantization methods.

Referring generally to FIG. 1, a simplified block diagram depicting a quantization processor 100 configured in accordance with an embodiment of the inventive concepts disclosed herein is shown. The quantization processor 100 may be configured to receive a high-resolution signal as input 102. The quantization processor 100 may quantize the input 102 and provide the quantized result 110 to a communication device (e.g., a radio or a satellite navigation receiver).

In some embodiments, the input 102 may include a high-resolution signal transformed in a transform domain using transform functions such as fast Fourier transform (FFT) or the like. The input 102 may need to be routed to a number of radio channels for subsequent processing. If the input 102 is to be provided to a satellite navigation receiver, for example, the input 102 may need to be routed to a large number of channels operating together in parallel (especially during acquisition). It may therefore be very important to limit the resolution of the input signal 102 in order to limit the number of logic gates required by the multipliers in the subsequent signal processing path.

As shown in FIG. 1, a resolution reducer 104 (e.g., implemented on one or more processors and/or circuits) may be utilized to scale and/or reduce the resolution of the input signal 102 to produce a low-resolution signal 120 according to a reduction ratio M:N, where M is the number of quantum levels in the input signal 102 and N is the number of quantum levels in the low-resolution signal 120. The power of the low-resolution signal 120 may also be leveled/normalized to an expected/predetermined level. It is noted that by reducing the resolution of the input signal 102 and leveling the power of the low-resolution signal 120, the resolution reducer 104 may help reduce the dynamic range of the low-resolution signal 120, which in turn allows the least significant bit(s) to be discarded, effectively reducing the complexity and the number of logic gates required of the inverse transform processor 106.

For example, suppose the input signal 102 is a 16-bit signal (having 65536 quantum levels), reducing the input signal 102 to an 8-bit (256 quantum levels) low-resolution signal 120 (a reduction ratio of 2:1 in bits of resolution, or 256:1 in quantum levels) may help reduce the complexity and the number of logic gates required of the inverse transform processor 106 by a factor of 4. The inverse transform processor 106 may therefore only need to implement a low-resolution inverse transform, which is faster, less complex, and less expensive.

It is to be understood that the 16-bit input signal and the 2:1 reduction in bits of resolution referenced in the examples above are merely exemplary and are not meant to be limiting. It is contemplated that the resolution of the input signal 102, the reduction ratio provided by the resolution reducer 104, and the specific resolution of the low-resolution signal 120 may vary without departing from the broad scope of the inventive concepts disclosed herein. Once the low-resolution signal 120 is inversely transformed into an inversely transformed low-resolution signal 122 by the inverse transform processor 106, the inversely transformed low-resolution signal 122 may be provided as input to a quantizer 108.

In some embodiments, the quantizer 108 may be implemented as a 2-level quantizer (shown in FIG. 2), which has a single quantization threshold and is configured to detect the polarity of the inversely transformed low-resolution signal 122 in order to generate a sign (+/−) bit as the quantized result 110. Alternatively, the quantizer 108 may be implemented as a 3-level quantizer (shown in FIG. 3), which uses two quantization thresholds to generate the quantized result 110. Since the quantization thresholds may be placed far apart from each other, a concern may arise with fitting the gain of the signal to the range of the quantization thresholds. For instance, if the gain of the signal is too large, the signal may have a significant clipping loss. On the other hand, if the gain is too low, the amplitude signal may fall between thresholds and the implementation loss (from quantization) may become infinite. To address this concern, it may be necessary to provide a control mechanism that controls the percentage of measurements that exceed full-scale (e.g., the outer most thresholds) at the quantizer 108.

In some embodiments, a feedback loop 112 may be utilized to serve as such a control mechanism. For example, the quantizer 108 may include a gain adaption circuit configured to determine signal gain and/or gain adjustment values needed in order to satisfy certain performance metrics (e.g., the clipping rate) at the quantizer 108. The quantizer 108 may provide (feedback) its knowledge of signal gain and/or gain adjustment values to the resolution reducer 104, which may adaptively adjust/control (e.g., level or normalize the power of) the signal going into the inverse transform processor 106. It is contemplated that this adaptive adjustment process may be performed until the desired performance metric (e.g., the clipping rate) is achieved at the quantizer 108. It is noted that utilizing the feedback loop 112 in this manner effectively moves the gain adaption of the quantizer 108 ahead of the inverse transform processor 106, allowing the inverse transform processor 106 to still benefit from having reduced complexity and reduced number of logic gates as previously described.

Figures 2, 3, 4:
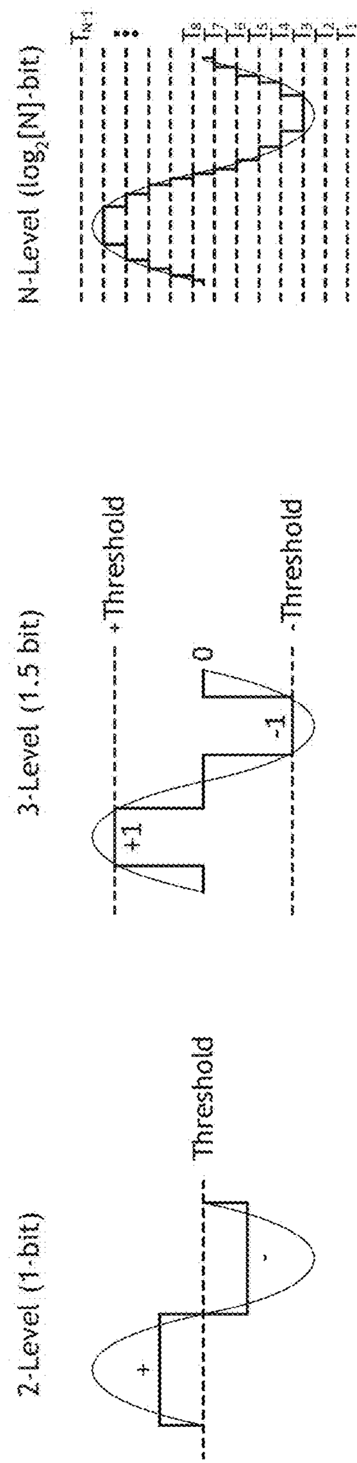
FIG. 2 is an illustration of a 2-level quantizer that may be utilized in an exemplary quantization processor according to an exemplary embodiment of the inventive concepts disclosed herein.
FIG. 3 is an illustration of a 3-level quantizer that may be utilized in an exemplary quantization processor according to an exemplary embodiment of the inventive concepts disclosed herein.
FIG. 4 is an illustration of an N-level quantizer that may be utilized in an exemplary quantization processor according to an exemplary embodiment of the inventive concepts disclosed herein.

It is to be understood that the 2-level and the 3-level quantizers depicted in the examples above are presented merely for illustrative purposes and are not meant to be limiting. It is contemplated that the quantizer 108 may be configured to support up to N levels (as shown in FIG. 4), and that the resolution reducer 104 may be configured to reduce the input signal 102 down to a minimum resolution required by the quantizer 108 without departing from the broad scope of the inventive concepts disclosed herein. It is noted, however, as N increases, adjusting the thresholds may become more cumbersome. Accordingly, in some embodiments, the number of levels supported by the quantizer 108 may be limited to 8 or lower.

It is also to be understood that the resolution reducer 104, the inverse transform processor 106, and the quantizer 108 are depicted as separate blocks in FIG. 1 for illustrative purposes. It is contemplated that while the resolution reducer 104, the inverse transform processor 106, and the quantizer 108 may be implemented as separate components in some embodiments, the resolution reducer 104, the inverse transform processor 106, and the quantizer 108 may also be implemented as integrated components of a communication device (e.g., a radio or a satellite navigation receiver). It is contemplated that the resolution reducer 104, the inverse transform processor 106, the quantizer 108, and the quantization processor 100 in general, may utilize one or more dedicated processing devices, application-specific integrated circuits (ASICs), field-programmable gate arrays (FPGAs), or various other types of processors or processing devices to carry out their intended functions without departing from the broad scope of the inventive concepts disclosed herein.

Figure 5:
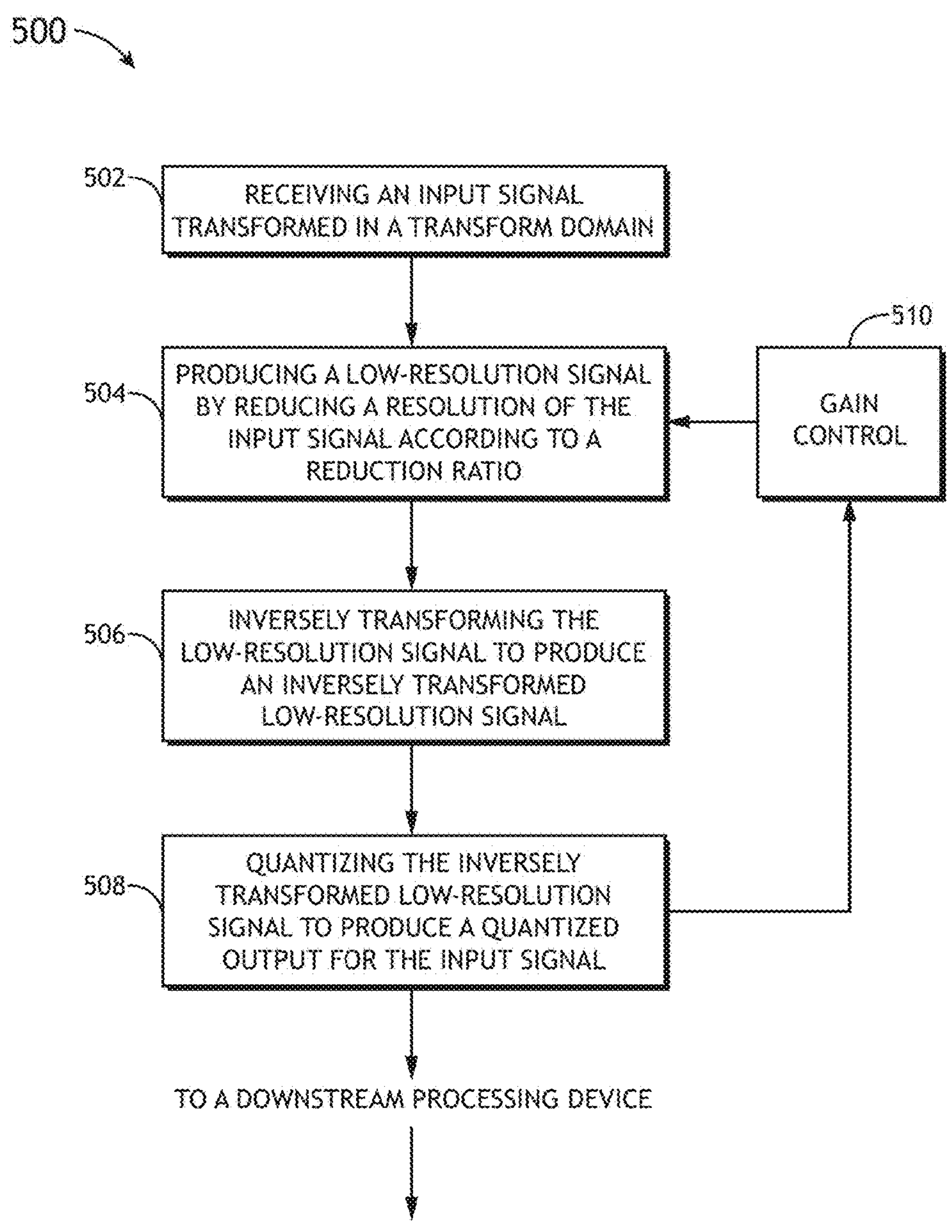
FIG. 5 is a flow diagram of an exemplary quantization method according to an exemplary embodiment of the inventive concepts disclosed herein.

Referring now to FIG. 5, a flow diagram depicting an embodiment of a quantization method 500 in accordance with the inventive concepts disclosed herein is shown. The quantization method 500 may be carried out by one or more processors configured to quantize a high-resolution input signal received from a transform domain (e.g., a frequency domain) in a step 502. The one or more processors may reduce the resolution of the input signal to a low-resolution signal in a resolution reduction step 504. The low-resolution signal may be inversely transformed in an inverse transform step 506, and the inversely transformed low-resolution signal may be quantized in a quantization step 508. The result of the quantization step 508 may be provided as output to a processing device downstream.

In some embodiments, the quantization method 500 may also include a gain control step 510. More specifically, one or more performance metrics (e.g., the clipping rate) may be measured to determine whether any signal gain adjustment is need. If it is determined that signal gain adjustment is needed, the determination may be provided to the resolution reduction step 504, which may apply the gain adjustment prior to providing the low-resolution signal to the inverse transform step 506, as previously described.

As will be appreciated from the above, the quantization processor 100 and the quantization method 500 configured in accordance with exemplary embodiments of the inventive concepts disclosed herein may help improve the efficiency of inverse transform processing by significantly reducing (e.g., at a ratio of 2:1, 3:1, 4:1 or greater in bits of resolution) the resolution of the signal going into the inverse transform processor, allowing the inverse transform processor to utilize a low-resolution inverse transform, which is faster, less complex, and less expensive. Additionally, if gain adjustment is needed, the adjustment can be applied to the signal prior to the inverse transform, effectively pushing a portion of the quantization process forward in the signal processing chain into the transform domain (e.g., frequency domain if FFTs are used) and allowing the inverse transform processor to still benefit from a low-resolution implementation. Furthermore, the quantization processor 100 and the quantization method 500 configured in accordance with exemplary embodiments of the inventive concepts disclosed herein may provide significant savings in the physical size of the inverse transform processors, which may be appreciated in various types of applications, including satellite navigation receivers, digital radios with beamforming applications, receivers with anti-jam functionalities and the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:

a resolution reducer configured to receive an input communication signal transformed in a transform domain, the resolution reducer further configured to produce an output signal by reducing a resolution of the input communication signal according to a reduction ratio;

an inverse transform processor configured to inversely transform the output signal to produce an inversely transformed resolution signal; and a quantizer configured to quantize the inversely transformed resolution signal to produce a quantized output for receipt and processing by a communication device, the communication device being one of a satellite navigation receiver, a receiver with anti-jam functionality or a digital radio with beamforming capability.

2. The apparatus of claim 1, wherein the quantizer is configured to utilize a single quantization threshold to quantize the inversely transformed resolution signal having two quantum levels.

3. The apparatus of claim 1, wherein the quantizer is configured to utilize a plurality of quantization thresholds to quantize the inversely transformed resolution signal.

4. The apparatus of claim 3, wherein the quantizer is further configured to:

determine a gain adjustment value; and provide the gain adjustment value to the resolution reducer.

5. The apparatus of claim 4, wherein the resolution reducer is further configured to normalize the output signal based on the gain adjustment value prior to providing the output signal with a normalized power to the inverse transform processor.

6. The apparatus of claim 5, wherein the quantizer is configured to utilize two quantization thresholds to quantize the inversely transformed resolution signal having three quantum levels.

7. The apparatus of claim 1, wherein the input communication signal has a first number of bits of resolution and the output signal has a second number of bits of resolution, and wherein the second number is reduced by at least a half compared to the first number.

8. An apparatus, comprising:

at least one processor configured to:

receive an input communication signal transformed in a transform domain;

produce an output signal by reducing a resolution of the input communication signal according to a reduction ratio;

inversely transform the output signal to produce an inversely transformed signal; and quantize the inversely transformed resolution signal to produce a quantized output for receipt and processing by a communication device, the communication device being one of a satellite navigation receiver, a receiver with anti-jam functionality or a digital radio with beamforming capability.

9. The apparatus of claim 8, wherein the at least one processor is configured to utilize a single quantization threshold to quantize the inversely transformed resolution signal.

10. The apparatus of claim 8, wherein the at least one processor is configured to utilize a plurality of quantization thresholds to quantize the inversely transformed resolution signal.

11. The apparatus of claim 10, wherein the at least one processor is further configured to:

determine a gain adjustment value; and normalize the output signal based on the gain adjustment value prior to inversely transforming the output signal.

12. The apparatus of claim 8, wherein the input communication signal has a first number of bits of resolution and the output signal has a second number of bits of resolution, and wherein the second number is reduced by at least a half compared to the first number.

13. A method, comprising:

receiving an input communication signal transformed in a transform domain;

producing an output signal by reducing a resolution of the input communication signal according to a reduction ratio;

inversely transforming the output signal to produce an inversely transformed resolution signal;

quantizing the inversely transformed resolution signal to produce a quantized output; and providing the quantized output to a communication device, the communication device being one of a satellite navigation receiver, a receiver with anti-jam functionality or a digital radio with beamforming capability.

14. The method of claim 13, further comprising:

determining a gain adjustment value; and normalizing the output signal based on the gain adjustment value prior to inversely transforming the output signal.

15. The method of claim 13, wherein the input communication signal has a first number of bits of resolution and the output signal has a second number of bits of resolution, and wherein the second number is reduced by at least a half compared to the first number.

* * * * *